United States Patent
Ganireddy et al.

(10) Patent No.: US 10,784,689 B2
(45) Date of Patent: Sep. 22, 2020

(54) ELECTRICAL POWER SYSTEMS AND METHODS USING DISTORTION FILTERS

(71) Applicant: General Electric Company, Schenectady, NY (US)

(72) Inventors: Govardhan Ganireddy, Roanoke, VA (US); Saurabh Shukla, Clifton Park, NY (US); Rajni Burra, Clifton Park, NY (US); Robert Gregory Wagoner, Roanoke, VA (US); Anthony Michael Klodowski, Hardy, VA (US); Yashomani Kolhatkar, Bangalore (IN)

(73) Assignee: General Electric Company, Schenectady, NY (US)

( * ) Notice: Subject to any disclaimer, the term of this patent is extended or adjusted under 35 U.S.C. 154(b) by 379 days.

(21) Appl. No.: 15/588,902

(22) Filed: May 8, 2017

(65) Prior Publication Data
US 2018/0323620 A1 Nov. 8, 2018

(51) Int. Cl.
*H02J 3/01* (2006.01)
*H02J 3/38* (2006.01)
(Continued)

(52) U.S. Cl.
CPC .............. *H02J 3/386* (2013.01); *H02J 3/01* (2013.01); *H02M 1/12* (2013.01); *H02M 5/04* (2013.01); *H02M 5/42* (2013.01)

(58) Field of Classification Search
CPC .. H02J 3/01; H02J 3/386; H02M 1/12; H02M 5/04; H02M 5/42
See application file for complete search history.

(56) References Cited

U.S. PATENT DOCUMENTS

| | | |
|---|---|---|
| 3,593,106 A | 7/1971 | Lafuze |
| 4,281,371 A | 7/1981 | Baker |

(Continued)

FOREIGN PATENT DOCUMENTS

| | | | |
|---|---|---|---|
| EP | 1276219 A1 | | 1/2003 |
| KR | 20130074231 A | * | 7/2013 |
| WO | WO2009/138808 A1 | | 11/2009 |

OTHER PUBLICATIONS

Translation for KR 20130074231 K (Year: 2013).*

(Continued)

*Primary Examiner* — Rexford N Barnie
*Assistant Examiner* — Elim Ortiz
(74) *Attorney, Agent, or Firm* — Dority & Manning, P.A.

(57) ABSTRACT

An electrical power system includes a cluster of electrical power subsystems, each of the electrical power subsystems including a power converter electrically coupled to a generator having a generator rotor and a generator stator. Each of the electrical power subsystems defines a stator power path and a converter power path for providing power to the power grid. The converter power path includes a partial power transformer. The electrical power system further includes a subsystem breaker configured with each of the electrical power subsystems, and a cluster transformer for connecting each cluster of electrical power subsystems to the power grid. The electrical power system further includes a cluster power path extending between each subsystem breaker and the cluster transformer, and a distortion filter electrically coupled to the cluster transformer. The distortion filter reduces harmonics in current flowing from the electrical power subsystems to the cluster transformer.

12 Claims, 11 Drawing Sheets

(51) Int. Cl.
*H02M 5/04* (2006.01)
*H02M 1/12* (2006.01)
*H02M 5/42* (2006.01)

(56) References Cited

U.S. PATENT DOCUMENTS

| | | |
|---|---|---|
| 5,047,910 A | 9/1991 | Levran et al. |
| 7,119,452 B2 | 10/2006 | Larsen |
| 7,166,928 B2 | 1/2007 | Larsen |
| 7,187,566 B2 | 3/2007 | Kawashima et al. |
| 7,212,421 B2 | 5/2007 | Chandra et al. |
| 7,224,081 B2 | 5/2007 | Larsen |
| 7,521,907 B2 | 4/2009 | Cervera et al. |
| 7,923,862 B2 | 4/2011 | Cardinal et al. |
| 8,013,580 B2 | 9/2011 | Cervera et al. |
| 8,041,465 B2 | 10/2011 | Larsen et al. |
| 8,659,178 B2 | 2/2014 | Arlaban Gabeiras et al. |
| 8,669,669 B1 | 3/2014 | Wagoner et al. |
| 8,736,241 B2 | 5/2014 | Cervera et al. |
| 9,537,437 B2 | 1/2017 | Wagoner et al. |
| 9,587,626 B2 | 3/2017 | Sadaba et al. |
| 2003/0227172 A1* | 12/2003 | Erdman ............ F03D 7/048 290/44 |
| 2010/0118568 A1* | 5/2010 | Helle ............ H02M 1/12 363/34 |
| 2011/0074365 A1* | 3/2011 | Nakayama ............ H02P 9/007 322/27 |
| 2012/0019007 A1 | 1/2012 | Nelson et al. |
| 2013/0257050 A1 | 10/2013 | Bech |
| 2013/0286692 A1 | 10/2013 | Patel et al. |
| 2013/0289911 A1 | 10/2013 | Patel et al. |
| 2014/0253058 A1 | 9/2014 | Cervera et al. |
| 2014/0320056 A1 | 10/2014 | Royak et al. |

OTHER PUBLICATIONS

Baron et al., Breaking the 34.5kV Standard, Drawing on hydro experience, Acciona extols use of 12kV collection system to lower energy costs through elimination of step-up transformers, Wind Systems Magazine, Apr. 2013, pp. 48-54.

Olonso Sadaba et al., Wind Generation Control Strategies for Grid Integration Acciona Windpower Experience, ResearchGate, Acciona Windpower, S.A., uploaded 2015, 11 Pages. https://www.researchgate.net/publicalion/267966410.

International Search Report and Written Opinion issued in connection with corresponding PCT Application No. PCT/US2018/031309 dated Aug. 29, 2018.

* cited by examiner

ELECTRICAL POWER SYSTEMS AND METHODS USING DISTORTION FILTERS

FIELD OF THE INVENTION

The present disclosure relates generally to electrical power systems for providing power to a power grid from, for example, wind turbines.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

Figure 1:
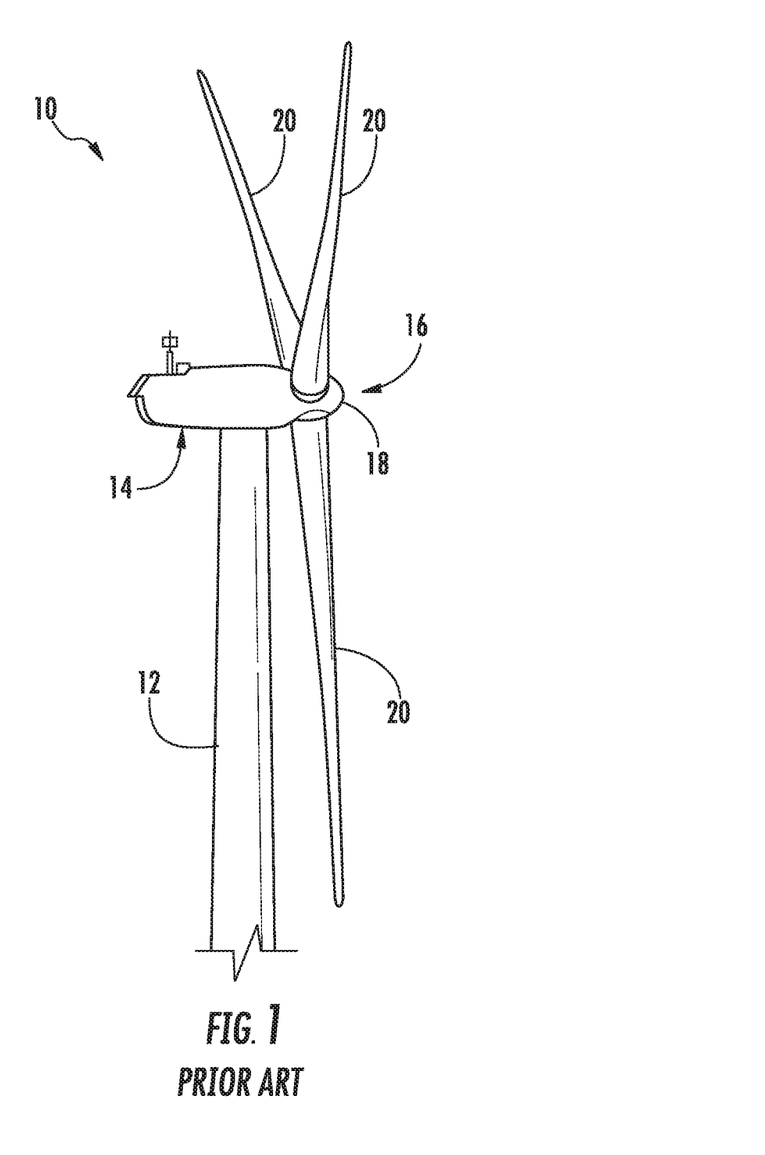
FIG. 1 illustrates a perspective view of a portion of one embodiment of a wind turbine according to conventional construction.
Figure 2:
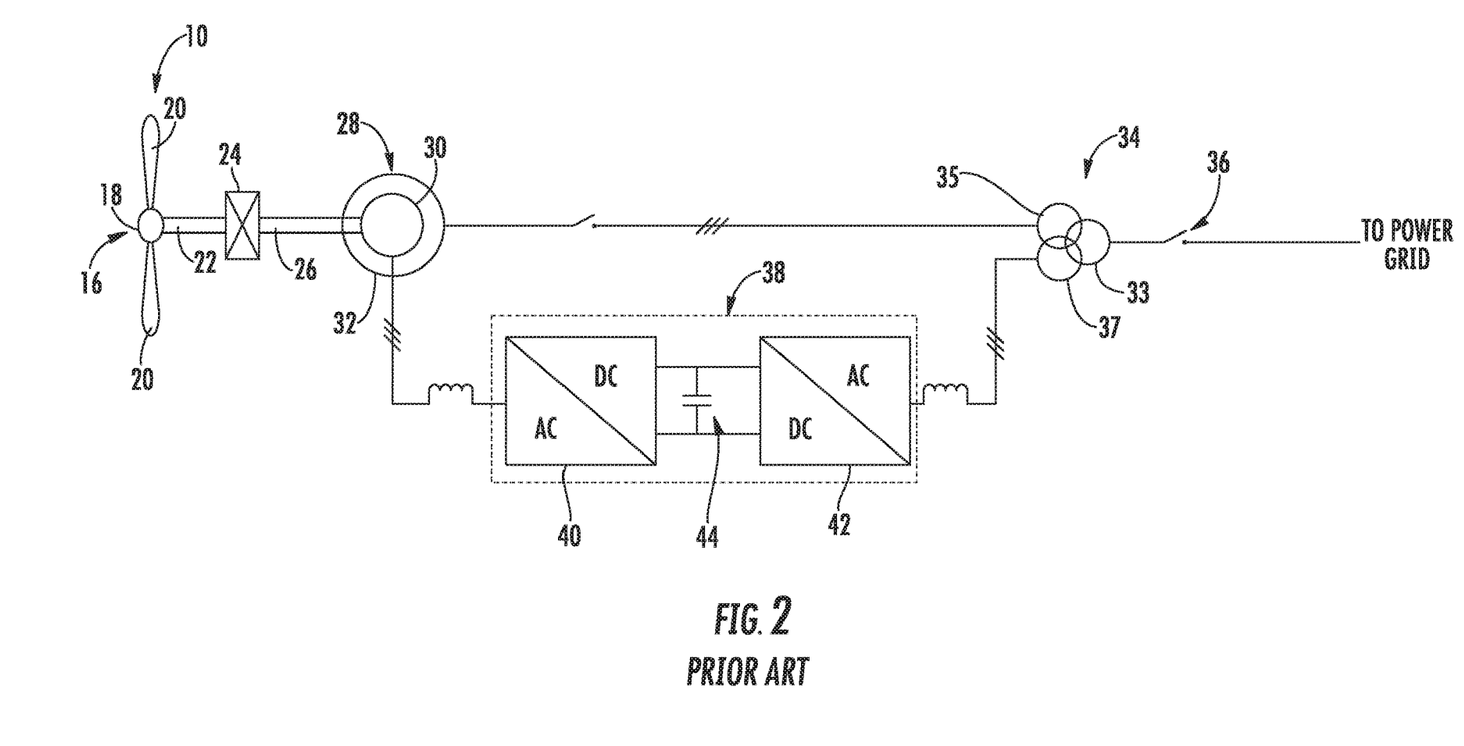
FIG. 2 illustrates a schematic diagram of a conventional electrical power system suitable for use with the wind turbine shown in FIG. 1.

For example, FIGS. 1 and 2 illustrate a wind turbine 10 and associated power system suitable for use with the wind turbine 10 according to conventional construction. As shown, the wind turbine 10 includes a nacelle 14 that typically houses a generator 28 (FIG. 2). The nacelle 14 is mounted on a tower 12 extending from a support surface (not shown). The wind turbine 10 also includes a rotor 16 that includes a plurality of rotor blades 20 attached to a rotating hub 18. As wind impacts the rotor blades 20, the blades 20 transform wind energy into a mechanical rotational torque that rotatably drives a low-speed shaft 22. The low-speed shaft 22 is configured to drive a gearbox 24 (where present) that subsequently steps up the low rotational speed of the low-speed shaft 22 to drive a high-speed shaft 26 at an increased rotational speed. The high-speed shaft 26 is generally rotatably coupled to a generator 28 (such as a doubly-fed induction generator or DFIG) so as to rotatably drive a generator rotor 30. As such, a rotating magnetic field may be induced by the generator rotor 30 and a voltage may be induced within a generator stator 32 that is magnetically coupled to the generator rotor 30. The associated electrical power can be transmitted from the generator stator 32 to a main three-winding transformer 34 that is typically connected to a power grid via a grid breaker 36. Thus, the main transformer 34 steps up the voltage amplitude of the electrical power such that the transformed electrical power may be further transmitted to the power grid.

In addition, as shown, the generator 28 is typically electrically coupled to a bi-directional power converter 38 that includes a rotor-side converter 40 joined to a line-side converter 42 via a regulated DC link 44. The rotor-side converter 40 converts the AC power provided from the rotor 30 into DC power and provides the DC power to the DC link 44. The line side converter 42 converts the DC power on the DC link 44 into AC output power suitable for the power grid. Thus, the AC power from the power converter 38 can be combined with the power from the stator 32 to provide multi-phase power (e.g. three-phase power) having a frequency maintained substantially at the frequency of the power grid (e.g. 50 Hz/60 Hz).

As shown in FIG. 2, the illustrated three-winding transformer 34 typically has (1) a 33 kilovolt (kV) medium voltage (MV) primary winding 33 connected to the power grid, (2) a 6 to 13.8 kV MV secondary winding 35 connected to the generator stator 32, and (3) a 690 to 900 volt (V) low-voltage (LV) tertiary winding 37 connected to the line-side power converter 42.

Figure 3:
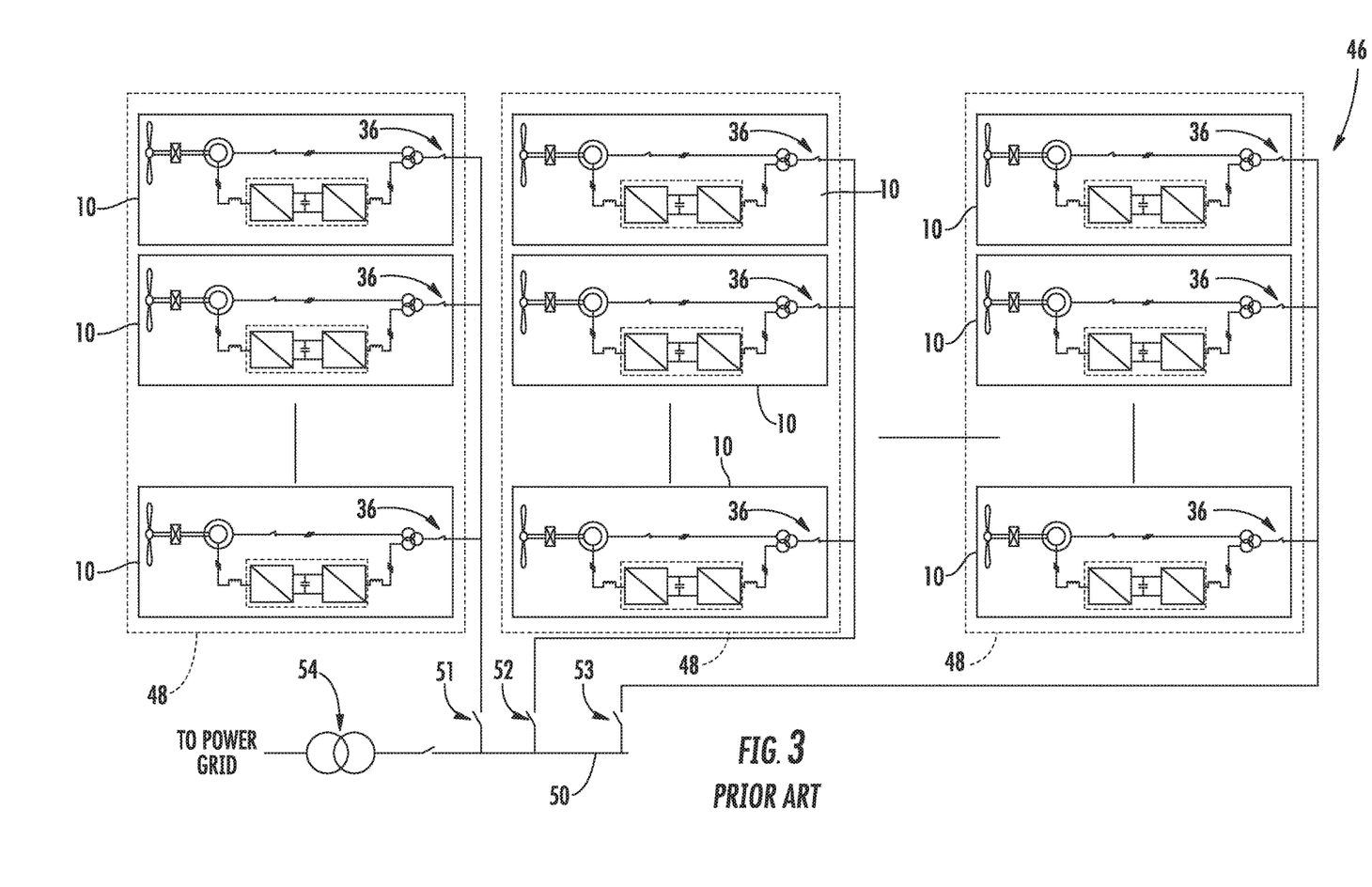
FIG. 3 illustrates a schematic diagram of one embodiment of a conventional wind farm according to conventional construction, particularly illustrating a plurality of wind turbine power systems such as those illustrated in FIG. 2 connected to a single sub-station transformer.

Referring now to FIG. 3, individual power systems of a plurality of wind turbines 10 may be arranged in a predetermined geological location and electrically connected together to form a wind farm 46. More specifically, as shown, the wind turbines 10 may be arranged into a plurality of groups 48 with each group separately connected to a main line 50 via switches 51, 52, 53, respectively. In addition, as shown, the main line 50 may be electrically coupled to another, larger transformer 54 for further stepping up the voltage amplitude of the electrical power from the groups 48 of wind turbines 10 before sending the power to the grid.

One issue with such systems, however, is that the three-winding transformers 34 associated with each turbine 10 are expensive. Particularly, the secondary winding 35 of the transformer 34 that is connected to the generator stator 32 can be costly. Thus, it would be advantageous to eliminate such three-winding transformers from wind turbine power systems.

Another issue that needs to be addressed in power systems is harmonics. For example, if the secondary winding is eliminated, this results in lower impedance in the system. Thus, there is an increased risk of such systems not meeting certain agency requirements for harmonics. Accordingly, power systems which include features for reducing the harmonic currents being injected into the power grid, particularly in view of agency harmonics requirements, would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, an electrical power system connectable to a power grid is provided. The electrical power system includes a cluster of electrical power subsystems, each of the electrical power subsystems including a power converter electrically coupled to a generator having a generator rotor and a generator stator. Each of the electrical power subsystems defines a stator power path and a converter power path for providing power to the power grid. The converter power path includes a partial power transformer. The electrical power system further includes a subsystem breaker configured with each of the electrical power subsystems, and a cluster transformer for connecting each cluster of electrical power subsystems to the power grid. The electrical power system further includes a cluster power path extending between each subsystem breaker and the cluster transformer, and a distortion filter electrically coupled to the cluster transformer. The distortion filter reduces harmonics in current flowing from the electrical power subsystems to the cluster transformer In accordance with another embodiment, a method for operating an electrical power system is provided. The electrical power system has a cluster of electrical power subsystems with a cluster transformer connecting the cluster of electrical power subsystems to a power grid. Each of the electrical power subsystems has a power converter electrically coupled to a generator with a generator rotor and a generator stator. Each of the electrical power subsystems defines a stator power path and a converter power path for providing power to the power grid, the converter power path including a partial power transformer. The method includes determining a indicator level of a current flowing from the cluster of electrical power subsystems to the cluster transformer, comparing the indicator level to a predetermined threshold, and, when the harmonic level exceeds the predetermined threshold, activating a distortion filter, the distortion filter electrically coupled to the cluster transformer.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 4:
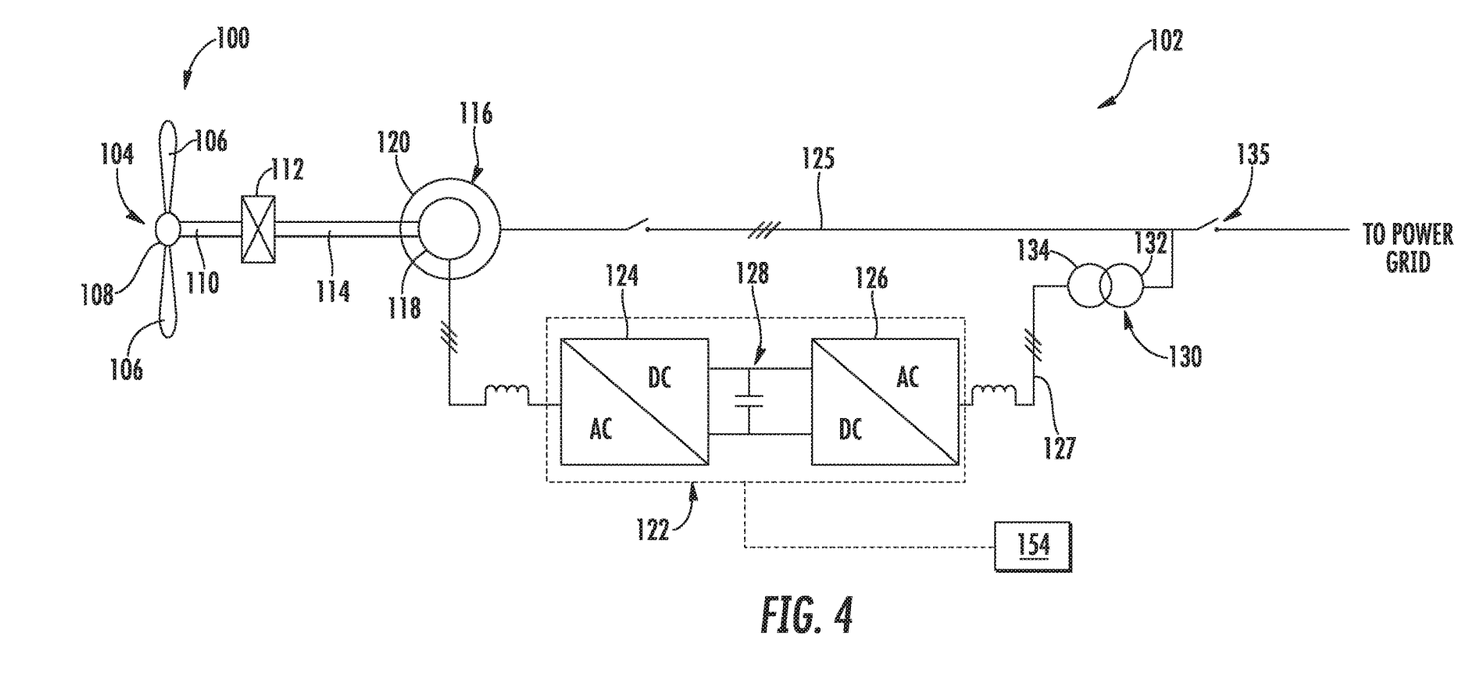
FIG. 4 illustrates a schematic diagram of one embodiment of an electrical power system for a wind turbine according to the present disclosure.

Referring now to FIG. 4, a schematic diagram of one embodiment of an electrical power subsystem 102 according to the present disclosure is illustrated. It should be understood that the term "subsystem" is used herein to distinguish between the individual power systems (e.g. as shown in FIG. 4 or FIG. 2) and the overall electrical power system 105 of FIG. 5 or FIG. 3 that includes a plurality of electrical power subsystems 102. Those of ordinary skill in the art, however, will recognize that the electrical power subsystem 102 of FIG. 4 (or FIG. 2) may also be referred to more generically, such as a simply a system (rather than a subsystem). Therefore, such terms may be used interchangeably and are not meant to be limiting.

Further, as shown, the electrical power subsystem 102 may correspond to a wind turbine power system 100. More specifically, as shown, the wind turbine power system 100 includes a rotor 104 that includes a plurality of rotor blades 106 attached to a rotating hub 108. As wind impacts the rotor blades 106, the blades 106 transform wind energy into a mechanical rotational torque that rotatably drives a low-speed shaft 110. The low-speed shaft 110 is configured to drive a gearbox 112 that subsequently steps up the low rotational speed of the low-speed shaft 110 to drive a high-speed shaft 114 at an increased rotational speed. The high-speed shaft 114 is generally rotatably coupled to a doubly-fed induction generator 116 (referred to hereinafter as DFIG 116) so as to rotatably drive a generator rotor 118. As such, a rotating magnetic field may be induced by the generator rotor 118 and a voltage may be induced within a generator stator 120 that is magnetically coupled to the generator rotor 118. In one embodiment, for example, the generator 116 is configured to convert the rotational mechanical energy to a sinusoidal, three-phase alternating current (AC) electrical energy signal in the generator stator 120. Thus, as shown, the associated electrical power can be transmitted from the generator stator 120 directly the grid.

In addition, as shown, the generator 116 is electrically coupled to a bi-directional power converter 122 that includes a rotor-side converter 124 joined to a line-side converter 126 via a regulated DC link 128. Thus, the rotor-side converter 124 converts the AC power provided from the generator rotor 118 into DC power and provides the DC power to the DC link 128. The line side converter 126 converts the DC power on the DC link 128 into AC output power suitable for the power grid. More specifically, as shown, the AC power from the power converter 122 can be combined with the power from the generator stator 120 via a converter power path 127 and a stator power path 125, respectively. For example, as shown, and in contrast to conventional systems such as those illustrated in FIGS. 1-3, the converter power path 127 may include a partial power transformer 130 for stepping up the voltage amplitude of the electrical power from the power converter 122 such that the transformed electrical power may be further transmitted to the power grid. Thus, as shown, the illustrated system 102 of FIG. 4 does not include the conventional three-winding main transformer described above. Rather, as shown in the illustrated embodiment, the partial power transformer 130 may correspond to a two-winding transformer having a primary winding 132 connected to the power grid and a secondary winding 134 connected to the line side converter 126. Notably, the partial power transformer may in some embodiments include a third auxiliary winding for auxiliary loads.

In addition, the electrical power subsystem 102 may include a controller 136 configured to control any of the components of the wind turbine 100 and/or implement the method steps as described herein. For example, as shown particularly in FIG. 6, the controller 136 may include one or more processor(s) 138 and associated memory device(s) 140 configured to perform a variety of computer-implemented functions (e.g., performing the methods, steps, calculations and the like and storing relevant data as disclosed herein). Additionally, the controller 136 may also include a communications module 142 to facilitate communications between the controller 136 and the various components of the wind turbine 100, e.g. any of the components of FIGS. 4 and 5. Further, the communications module 142 may include a sensor interface 144 (e.g., one or more analog-to-digital converters) to permit signals transmitted from one or more sensors 139, 141, 143 to be converted into signals that can be understood and processed by the processors 138. It should be appreciated that the sensors 139, 141, 143 may be communicatively coupled to the communications module 142 using any suitable means. For example, as shown in FIG. 6, the sensors 139, 141, 143 may be coupled to the sensor interface 144 via a wired connection. However, in other embodiments, the sensors 139, 141, 143 may be coupled to the sensor interface 144 via a wireless connection, such as by using any suitable wireless communications protocol known in the art. As such, the processor 138 may be configured to receive one or more signals from the sensors 139, 141, 143.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 138 is also configured to compute advanced control algorithms and communicate to a variety of Ethernet or serial-based protocols (Modbus, OPC, CAN, etc.). Additionally, the memory device(s) 140 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 138, configure the controller 136 to perform the various functions as described herein.

In operation, alternating current (AC) power generated at the generator stator 120 by rotation of the rotor 104 is provided via a dual path to the grid, i.e. via the stator power path 125 and the converter power path 127. More specifically, the rotor side converter 124 converts the AC power provided from the generator rotor 118 into DC power and provides the DC power to the DC link 128. Switching elements (e.g. IGBTs) used in bridge circuits of the rotor side converter 124 can be modulated to convert the AC power provided from the generator rotor 118 into DC power suitable for the DC link 128. The line side converter 126 converts the DC power on the DC link 128 into AC output power suitable for the grid. In particular, switching elements (e.g. IGBTs) used in bridge circuits of the line side converter 126 can be modulated to convert the DC power on the DC link 128 into AC power. As such, the AC power from the power converter 122 can be combined with the power from the generator stator 120 to provide multi-phase power having a frequency maintained substantially at the frequency of the grid. It should be understood that the rotor side converter 124 and the line side converter 126 may have any configuration using any switching devices that facilitate operation of electrical power system as described herein.

Further, the power converter 122 may be coupled in electronic data communication with the turbine controller 136 and/or a separate or integral converter controller 154 to control the operation of the rotor side converter 124 and the line side converter 126. For example, during operation, the controller 136 may be configured to receive one or more voltage and/or electric current measurement signals from the first set of voltage and electric current sensors 139, 141, 143. Thus, the controller 136 may be configured to monitor and control at least some of the operational variables associated with the wind turbine 100 via the sensors 139, 141, 143. In the illustrated embodiment, the sensors 139, 141, 143 may be electrically coupled to any portion of electrical power subsystem 102 that facilitates operation of electrical power subsystem 102 as described herein.

It should also be understood that any number or type of voltage and/or electric current sensors may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art. Thus, the converter controller 154 is configured to receive one or more voltage and/or electric current feedback signals from the sensors 139, 141, 143. More specifically, in certain embodiments, the current or voltage feedback signals may include at least one of line feedback signals, line-side converter feedback signals, rotor-side converter feedback signals, or stator feedback signals.

Figure 5:
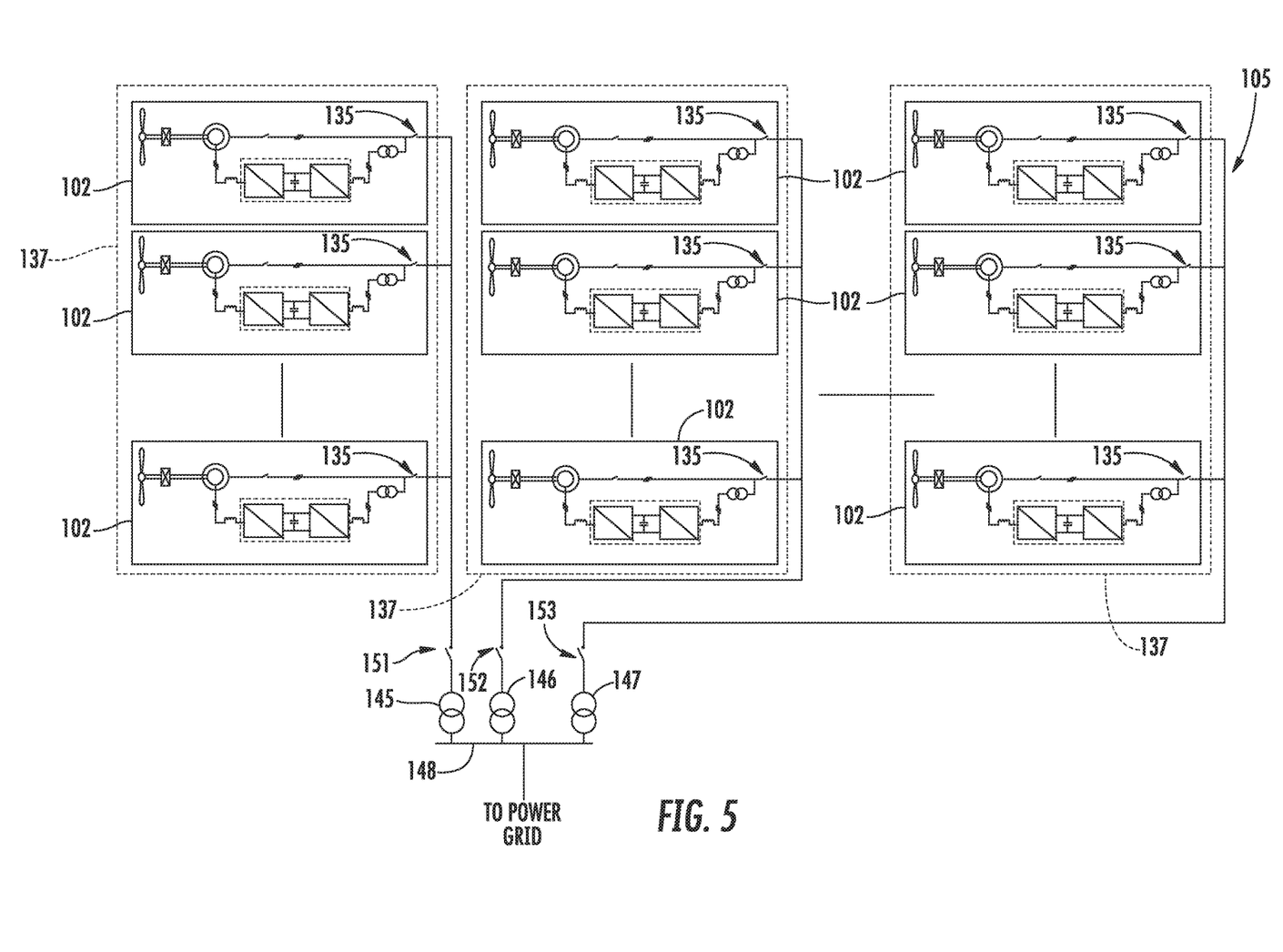
FIG. 5 illustrates a schematic diagram of one embodiment of a wind farm according to the present disclosure, particularly illustrating a plurality of wind turbine clusters each connected to the grid via a cluster transformer.
Figure 6:
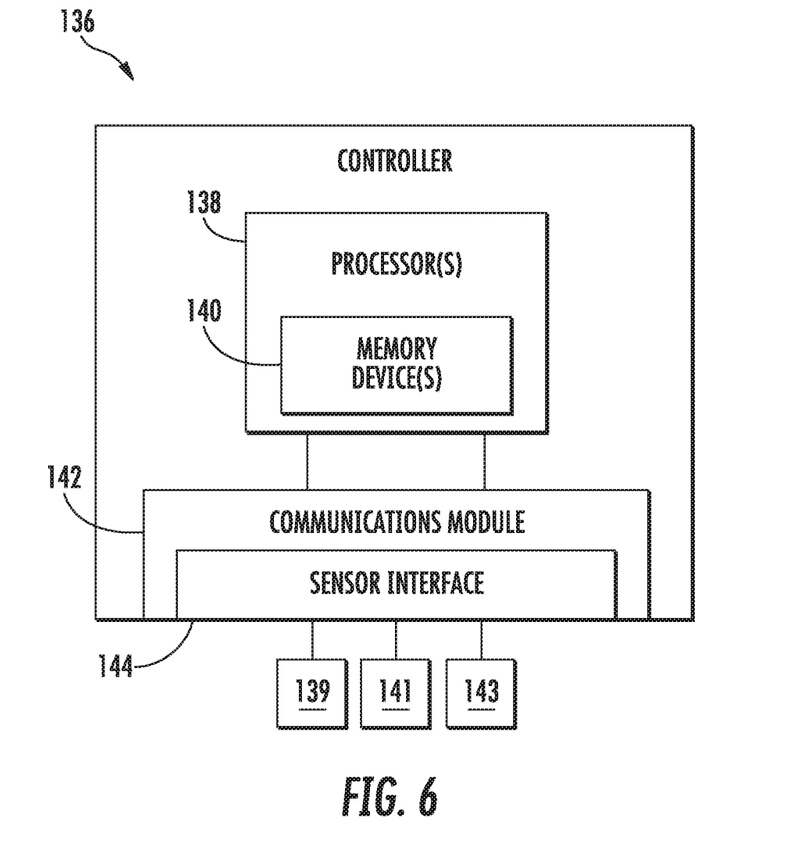
FIG. 6 illustrates a block diagram of one embodiment of a wind turbine controller according to the present disclosure.

Referring particularly to FIG. 5, individual power systems (such as the power subsystem 102 illustrated in FIG. 4) may be arranged in at least two clusters 137 to form an electrical power system 105. More specifically, as shown, the wind turbine power systems 100 may be arranged into a plurality of clusters 137 so as to form a wind farm. Thus, as shown, each cluster 137 may be connected to a separate cluster transformer 145, 146, 147 via switches 151, 152, 153, respectively, for stepping up the voltage amplitude of the electrical power from each cluster 137 such that the transformed electrical power may be further transmitted to the power grid. In addition, as shown, the transformers 145, 146, 147 are connected to a main line 148 that combines the power from each cluster 137 before sending the power to the grid. In other words, as shown, the stator power circuit of all the wind turbines 100 share a common ground reference provided by the neutral of the secondary winding 124 of the cluster transformer 145, 146, 147 or by a separate neutral grounding transformer. Each subsystem 102 may be connected to the cluster 137 via a subsystem breaker 135, as shown.

Referring now to FIGS. 7 through 11, various embodiments of electrical power systems 105 having improved harmonic reduction features are provided. A system 105 in accordance with the present disclosure includes a cluster 137 of electrical power subsystems 102, and further advantageously includes a distortion filter 160. The distortion filter 160 is electrically coupled to the cluster transformer 145, 146, 147 of the cluster 137, and advantageously provides harmonic filtering for the cluster 137. Specifically, harmonics currents flowing from each subsystem 102 to the transformer 145, 146, 147 may be filtered by the distortion filter 160 before flowing to the transformer 145, 146, 147.

The distortion filter 160 for each cluster 137 may advantageously absorb harmonic currents at frequencies higher than the fundamental frequencies (i.e. 50 Hz or 60 Hz), such as harmonic currents at frequencies from the second harmonic to the fiftieth harmonic. Because the distortion filter 160 is coupled to a cluster 137, the overall cost and complexity of the cluster 137 is reduced and multiple additional or alternative filters for each individual subsystem 102 are not required.

Figure 10:
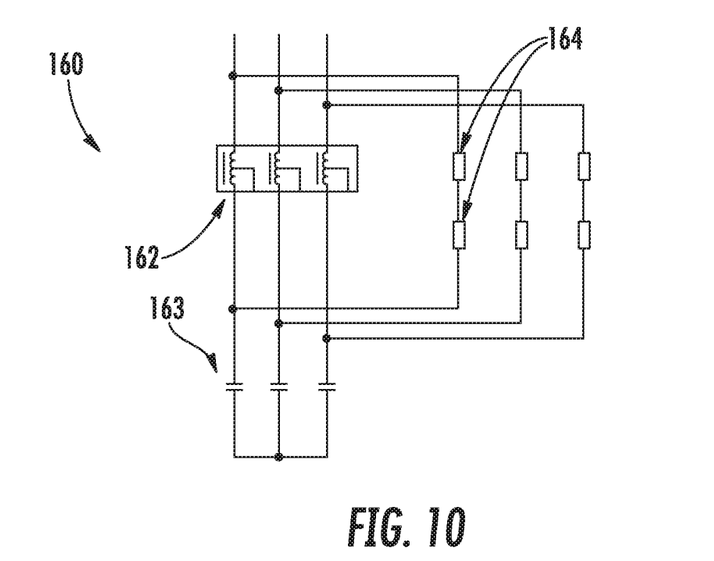
FIG. 10 illustrates a schematic diagram of one embodiment of a passive distortion filter according to the present disclosure.
Figure 11:
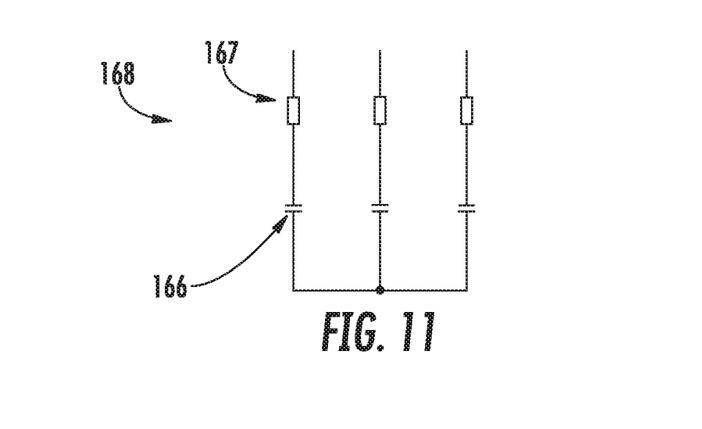
FIG. 11 illustrates a schematic diagram of another embodiment of a passive distortion filter according to the present disclosure.

In some embodiments, the distortion filter 160 is a passive filter. For example, FIG. 10 illustrates one embodiment of a passive distortion filter 160 in which each phase of the distortion filter 160 includes an inductor 162 and capacitor 163 in series and further includes a resistor 164. FIG. 11 illustrates another embodiment of a passive distortion filter 160 in which each phase of the distortion filter 160 includes a capacitor 166 and a resistor 167 in series. In other embodiments, the distortion filter 160 is an active filter. An active distortion filter may include active electronics circuits, which contain devices like MOSFETs, BJTs, and IGBTs. Active distortion filters reduce voltage and current harmonics, as well as flicker and voltage variations in power systems via the injection of reactive current compensation using a digitally controlled power converter, as is generally understood. It should additionally be noted that, in some embodiments, distortion filter 160 may include both passive and active filter components.

Figure 7:
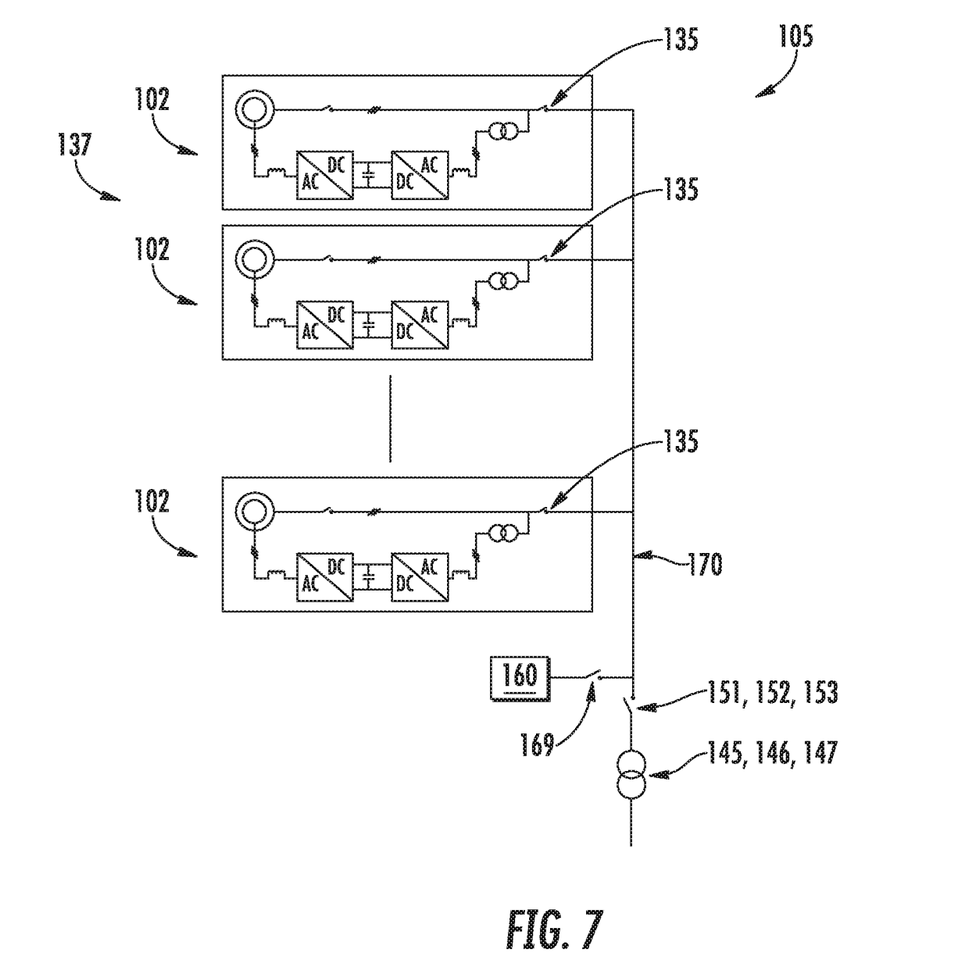
FIG. 7 illustrates a schematic diagram of one embodiment of an electrical power system including a cluster of subsystems and a distortion filter according to the present disclosure.
Figure 8:
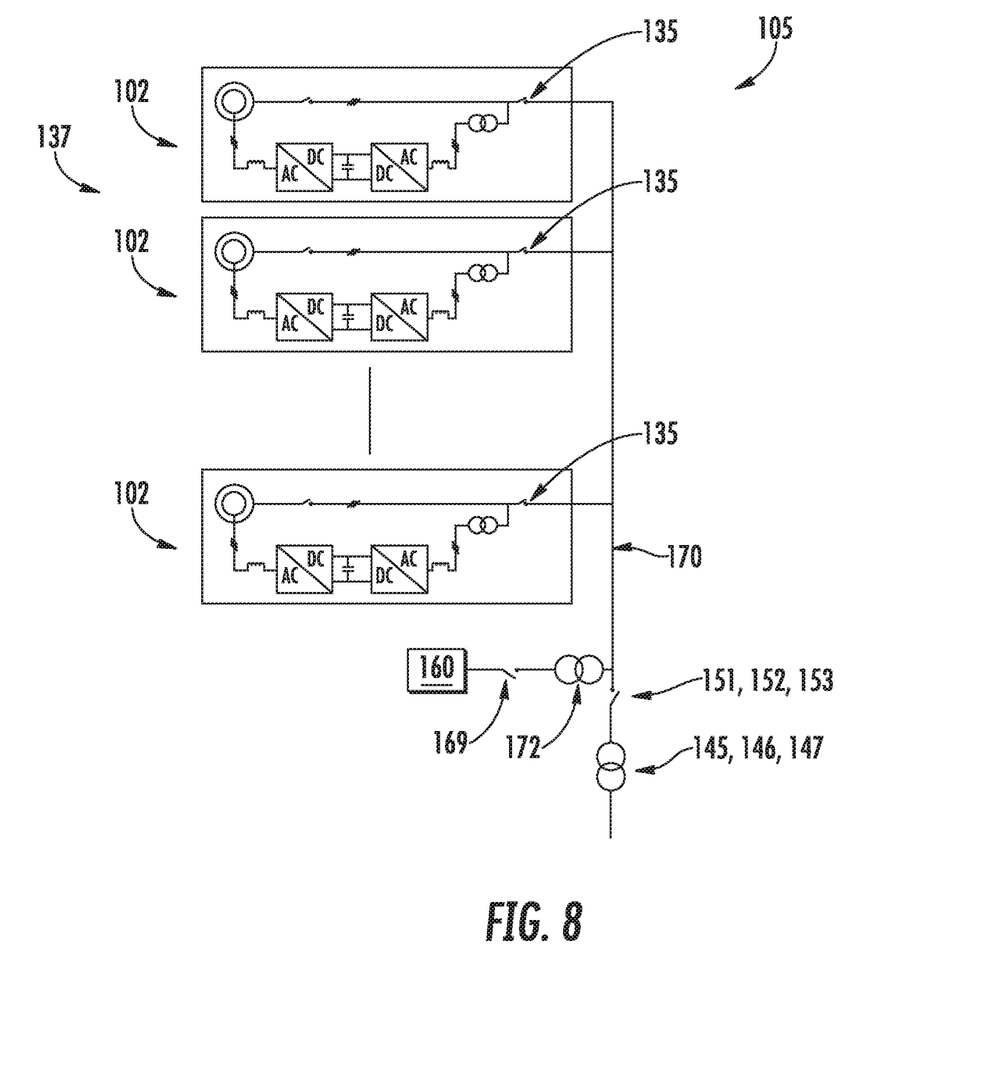
FIG. 8 illustrates a schematic diagram of another embodiment of an electrical power system including a cluster of subsystems and a distortion filter according to the present disclosure.
Figure 9:
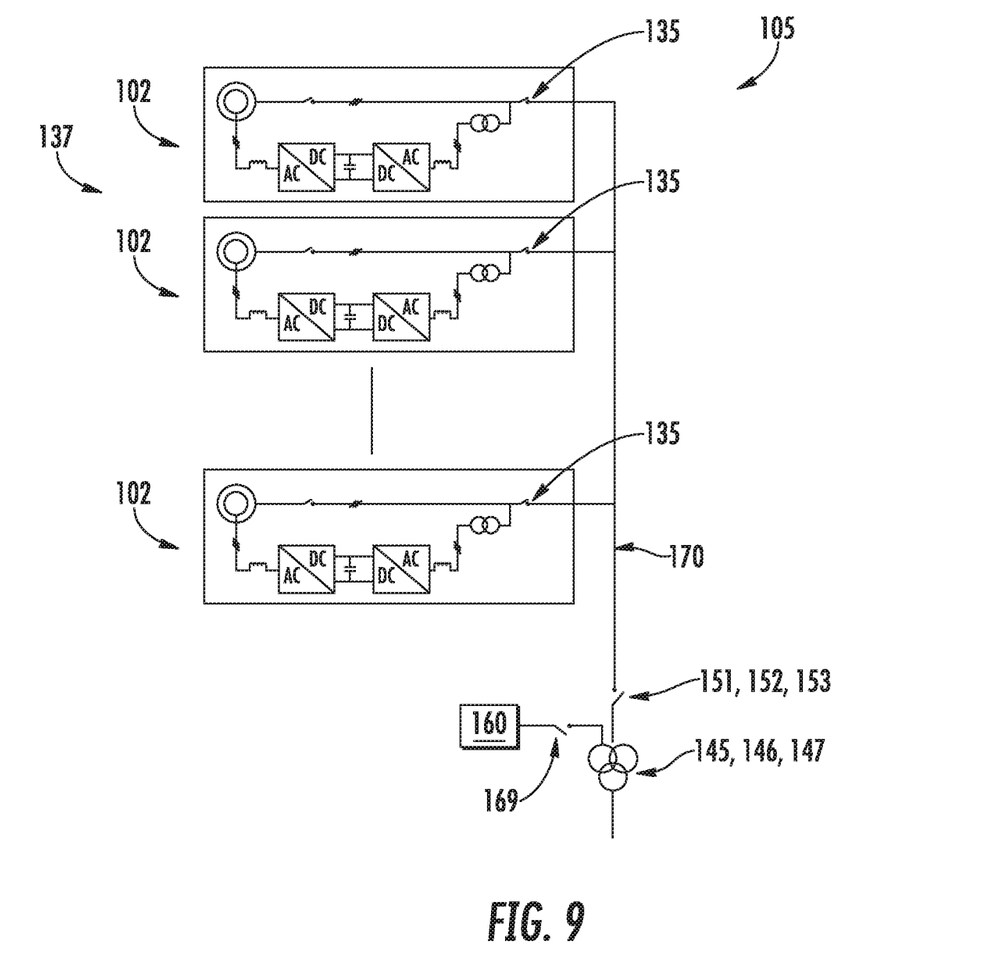
FIG. 9 illustrates a schematic diagram of another embodiment of an electrical power system including a cluster of subsystems and a distortion filter according to the present disclosure.

As shown in FIGS. 7 through 9, a cluster 137 of electrical power subsystems 102 includes a subsystem breaker 135 electrically coupled with each of the electrical power subsystems 102. Further, as discussed, the cluster 137 includes a cluster transformer 145, 146, 147 connecting each cluster 137 of electrical power subsystems 102 to the power grid. Thus, the cluster 137 also includes a cluster switch 150, 151, 152 configured with the cluster transformer 145, 146, 147. Still further, a filter switch 169 may be configured with the distortion filter 160 for electrically coupling the distortion filter 160 with the cluster 137 and the transformer 145, 146, 147. More specifically, in certain embodiments, the subsystem breakers 135, the cluster switch 145, 146, 147, and the distortion filter switch 169 may include relays. As used herein, a "relay" generally refers to an electrically-operated switch. For example, certain relays use an electromagnet to mechanically operate a switch, as well as solid-state relays. As such, relays may be useful where it is necessary to control a circuit by a separate low-power signal, or where several circuits must be controlled by one signal.

A cluster power path 170 may electrically connect the cluster 137 to the cluster transformer 145, 146, 147. The cluster power path 170 may, for example, extend for each subsystem 102 from the subsystem breaker 135 to the cluster transformer 145, 146, 147, such as to the winding of the cluster transformer to which the subsystem 102 is connected.

As shown, the distortion filter 160 is separate from the subsystems 102. In exemplary embodiments, as shown in FIGS. 7 through 9, the distortion filter 160 is located relatively closer to the associated cluster transformer 145, 146, 147 than to any of the subsystems 102 in the associated cluster 137. More specifically, the distortion filter 160 may be electrically coupled to the cluster transformer 145, 146, 147 at a location closer to the cluster transformer 145, 146, 147 than to the subsystem breaker 135 of any of the subsystems 102 in the cluster 137. Such differential locations may be defined based on the physical distance of the electrical power path between the various locations as stated above. By being relatively closer to the cluster transformer 145, 146, 147, the distortion filter 160 may advantageously provide more efficient harmonic filtering shortly before the electrical current flows through the cluster transformer 145, 146, 147.

In some embodiments, as illustrated in FIGS. 7 and 8, the cluster transformer 145, 146, 147 is a two-winding transformer. In these embodiments, the distortion filter 160 may be electrically coupled to the cluster power path 170. For example, FIG. 7 illustrates one embodiment wherein the distortion filter 160 is directly electrically coupled, through the filter switch 169, to the cluster power path 170. FIG. 8 illustrates another embodiment wherein the distortion filter 160 is coupled to the cluster power path 170, through the filter switch 169, via a filter transformer 172. The filter transformer 172 may, in exemplary embodiments as shown, be a two-winding transformer.

In other embodiments, as shown in FIG. 9, the cluster transformer 145, 146, 147 is a three-winding transformer. In these embodiments, the distortion filter 160 is electrically coupled to a winding of the three-winding transformer 145, such as to a winding separate from the winding coupled to the cluster power path 170 and the winding connected to the main line 148 leading to the power grid.

Controller 136 as described herein is communicatively coupled to each of the plurality of electrical power subsystems 102 and to the distortion filter 160 so as to control operation thereof. More particularly, controller 136 may be communicatively coupled to the subsystem breaker 135 of each subsystem 102, as well as to the distortion filter switch 169. Controller 136 may further be communicatively coupled to the cluster switch 150, 151, 152 of the cluster transformer 145, 146, 147 associated with the cluster 137.

For example, the controller 136 may be configured to determine an indicator level in the cluster power path 170, such as by monitoring the current flowing through the cluster power path 170. In exemplary embodiments, the indicator level is a harmonic level, such as the level of one or more harmonics. Alternatively, however, the indicator may be voltage, temperature, or power level. Further, when the indicator level exceeds a predetermined threshold (which may for example be pre-programmed into the controller 136), the controller 136 may activate the filter switch 169 to activate the distortion filter 160, i.e. by closing the filter switch 169. Still further, when the indicator level falls below a secondary predetermined threshold (which may for example be pre-programmed into the controller 136 and which may be the same as or different from the predetermined threshold), the controller 136 may deactivate the filter switch 169 to deactivate the distortion filter 160, i.e. by opening the filter switch 169. In some embodiments, a hysteresis function may be utilized to activate and deactivate the filter switch 169 and distortion filter 170 in accordance with the present disclosure.

Figure 12:
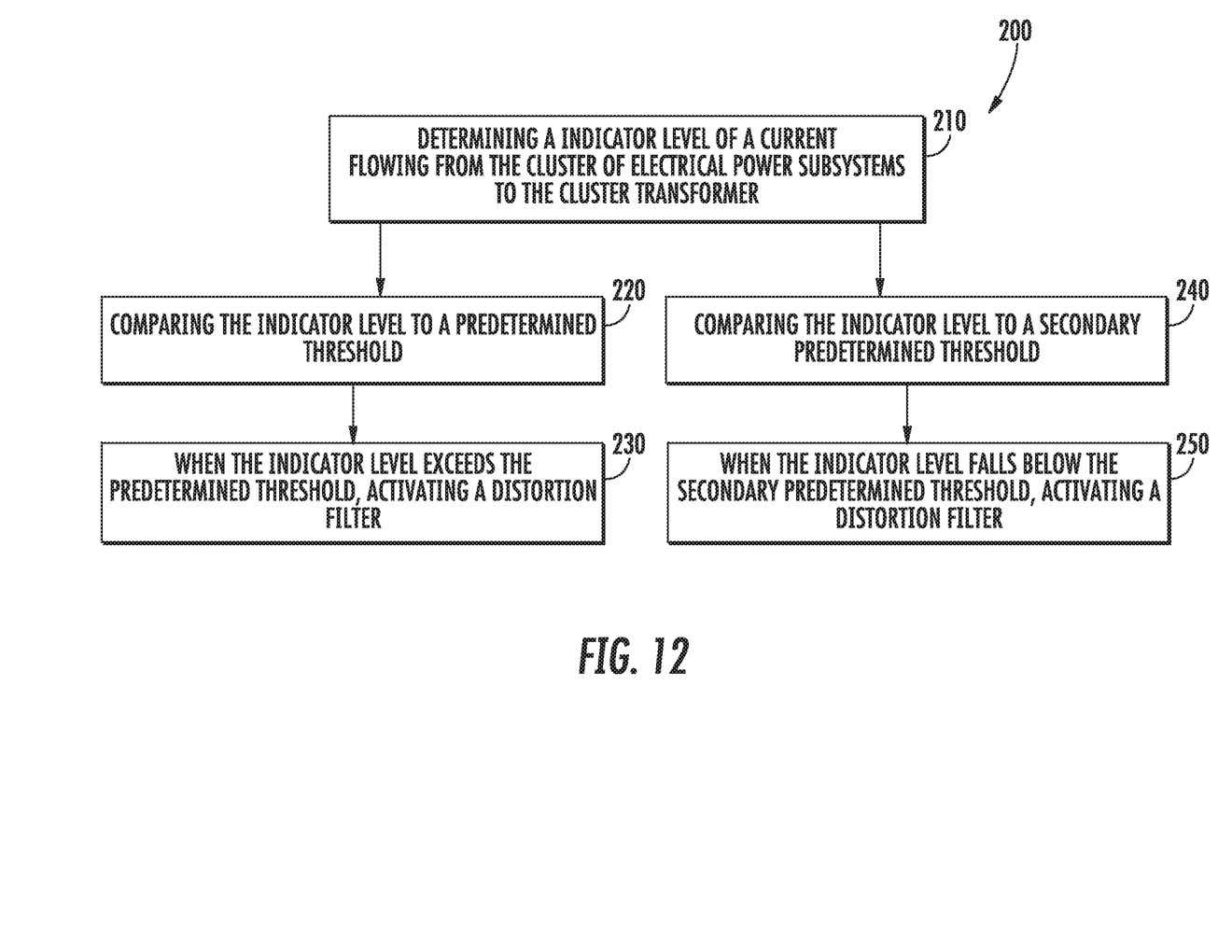
FIG. 12 is a flow chart illustrating methods for operating electrical power systems according to the present disclosure.

The present disclosure is further directed to methods 200 for operating electrical power systems 105. Such methods or components thereof may, for example, be performed by a controller 136 as discussed herein. For example, method 200 may include the step 210 of determining a indicator level of a current flowing from a cluster 137 of electrical power subsystems 102 to a cluster transformer 145, 146, 147, as discussed herein. Method 200 may further include, for example, the step 220 of comparing the indicator level to a predetermined threshold, as discussed herein. Method 200 may further include, for example, the step 230 of activating a distortion filter 160, such as via activation of an associated distortion switch 169, when the indicator level exceeds the predetermined threshold as discussed herein. Method 200 may further include, for example, the step 240 of comparing the indicator level to a secondary predetermined threshold, as discussed herein. Method 200 may further include, for example, the step 250 of deactivating the distortion filter 160, such as via activation of an associated distortion switch 169, when the indicator level exceeds the secondary predetermined threshold as discussed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electrical power system connectable to a power grid, comprising:
   a cluster of electrical power subsystems, each of the electrical power subsystems comprising a power converter electrically coupled to a generator having a generator rotor and a generator stator, each of the electrical power subsystems defining a stator power path and a converter power path for providing power to the power grid, the converter power path comprising a partial power transformer;
   a subsystem breaker configured with each of the electrical power subsystems;
   a cluster transformer for connecting each cluster of electrical power subsystems to the power grid;
   a cluster power path extending between each subsystem breaker and the cluster transformer;
   an active distortion filter electrically coupled to the cluster transformer, wherein the active distortion filter is configured to inject a reactive compensation to reduce harmonics in current flowing from the electrical power subsystems to the cluster transformer; and
   a filter transformer coupled between the active distortion filter and the cluster transformer.

2. The electrical power system of claim 1, wherein the active distortion filter is electrically coupled to the cluster transformer at a location closer to the cluster transformer than to the subsystem breaker of any of the electrical power subsystems in the cluster.

3. The electrical power system of claim 1, wherein the cluster transformer comprises a two-winding transformer.

4. The electrical power system of claim 3, wherein the active distortion filter is electrically coupled to the cluster power path by the filter transformer, the filter transformer comprising a two-winding transformer.

5. The electrical power system of claim 1, wherein the cluster transformer comprises a three-winding transformer and the active distortion filter is electrically coupled to a winding of the three-winding transformer.

6. The electrical power system of claim 1, further comprising:
   a filter switch configured with the active distortion filter; and
   a controller communicatively coupled to each of the electrical power subsystems and the active distortion filter, the controller configured to determine an indicator level in the cluster power path and, when the indicator level exceeds a predetermined threshold, activating the filter switch to activate the active distortion filter.

7. A method for operating an electrical power system, the electrical power system having a cluster of electrical power subsystems with a cluster transformer connecting the cluster of electrical power subsystems to a power grid, each of the electrical power subsystems having a power converter electrically coupled to a generator with a generator rotor and a generator stator, each of the electrical power subsystems defining a stator power path and a converter power path for providing power to the power grid, the converter power path including a partial power transformer, the method comprising:
   determining an indicator level of a current flowing along a cluster power path extending from the cluster of electrical power subsystems to the cluster transformer;
   comparing the indicator level to a predetermined threshold; and
   when the indicator level exceeds the predetermined threshold, activating an active distortion filter, the active distortion filter electrically coupled to the cluster transformer, the active distortion filter configured to inject a reactive compensation to reduce harmonics in current flowing from the electrical power subsystems to the cluster transformer,
   wherein a filter transformer is coupled between the active distortion filter and the cluster transformer.

8. The method of claim 7, wherein the partial power transformer comprises a two-winding transformer.

9. The method of claim 7, wherein the active distortion filter is electrically coupled to the cluster transformer at a location closer to the cluster transformer than to a subsystem breaker of any of the electrical power subsystems in the cluster.

10. The method of claim 7, wherein the cluster transformer comprises a two-winding transformer.

11. The method of claim 10, wherein the active distortion filter is electrically coupled to the cluster power path by the filter transformer, the filter transformer comprising a two-winding transformer.

12. The method of claim 7, wherein the cluster transformer comprises a three-winding transformer and the active distortion filter is electrically coupled to a winding of the three-winding transformer.

* * * * *